Aug. 22, 1950     J. R. THORP     2,519,514
DEFROSTER
Filed Jan. 27, 1945
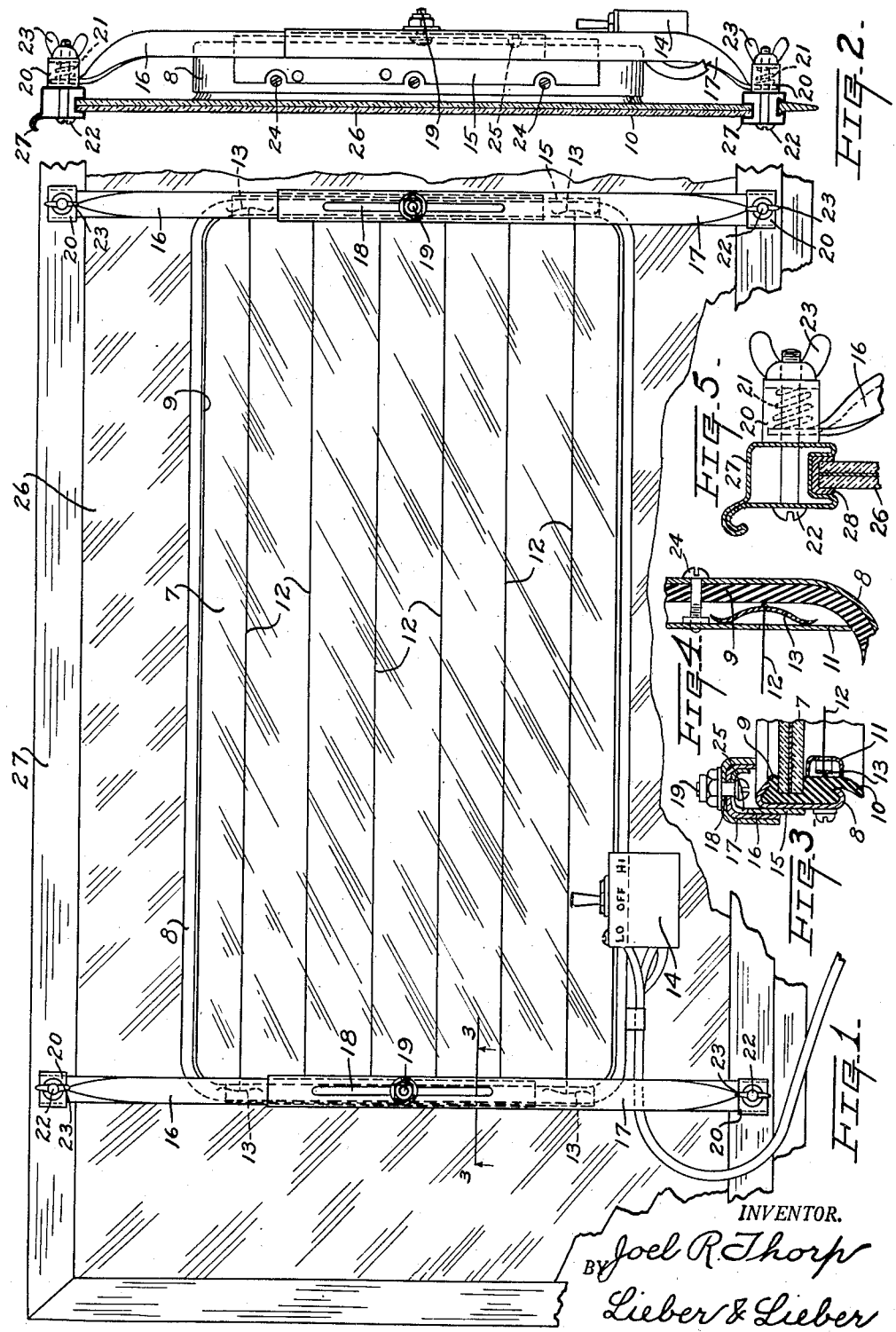
INVENTOR.
BY Joel R. Thorp
Lieber & Lieber
ATTORNEYS.

Patented Aug. 22, 1950

2,519,514

UNITED STATES PATENT OFFICE 2,519,514

DEFROSTER

Joel R. Thorp, West Allis, Wis., assignor to The Fulton Company, West Allis, Wis., a corporation of Wisconsin Application January 27, 1945, Serial No. 574,906

1 Claim. (Cl. 20—40.5)

The present invention relates generally to improvements in the art of maintaining clear vision for the occupants of vehicles, and relates more especially to improvements in the construction of windshield defrosters for trucks and other vehicles which may be subject to considerable vibration and jarring during normal use.

The principal object of my present invention is to provide an improved windshield defroster which is simple in construction and reliable in use.

It has long been customary to utilize so-called frost shields or defrosters of diverse types, in order to maintain clear vision for the occupants of vehicles such as automobiles, by preventing deposition of condensate, frost, snow, ice or the like on the vehicle windows. One of the most successful and extensively used prior types of these defrosters, consisted primarily of a pane of transparent material such as glass confined within a rectangular peripheral frame provided with a continuous sealing strip adapted to contact the vehicle windshield so as to produce an extensive dead air space between the defroster and windshield panes, and the dead air space was spanned by a number of electrically energized parallel heating wires while the defroster assemblage was secured to the interior of the windshield by means of a number of rubber suction cups carried by the frame. This type of defroster while being entirely satisfactory for use on ordinary smooth riding vehicles such as pleasure cars, has encountered considerable difficulty when applied to trucks and other vehicles which are subject to violent jarring and extreme vibration during normal use.

In this prior electrically heated frost shield, the heating wires which spanned the dead air space, were suspended from the frame by means of resilient leaf springs which were permanently and rigidly secured to the frame and were biased so as to constantly stretch and to compensate for expansion and contraction of the wires in an effort to keep them taut. This rigid attachment of the wire tensioning springs to the frame was objectionable, because sudden jolting of the assemblage would tend to distort the fixed springs and would thereby prevent them from maintaining the heating wires sufficiently taut to avoid contact with and possible resultant cracking of the dead air space confining panes. Then too, the rubber suction cups which were previously employed to suspend the defroster units from the windshield or other window with which the assemblages were associated, would also become loose due to severe vibration, and would thus destroy the utility of the devices either by permitting air to circulate through the dead air spaces, or by causing the units to drop off of the supporting windows.

It is therefore a more specific object of the present invention to provide various improvements in frost shields whereby these prior difficulties are definitely avoided, and which will insure proper functioning of such defrosters under most severe operating conditions.

Another specific object of the invention is to provide an improved electrically heated defroster assembly wherein the heating wires are most effectively supported from the frame in a manner whereby these wires will always be maintained under proper tension, and will not lose their tension due to jarring or rough handling of the unit.

A further specific object of this invention is to provide an improved mounting for dead air space defrosting accessories, which will permit such frost shields to be firmly applied to trucks and other rough riding vehicles, without danger of becoming loose from their moorings.

Still another specific object of my invention is to provide a new and useful defrosting device, which is exceedingly reliable and efficient in operation, which will effectively withstand vibration and impact, which assures clear vision under most adverse conditions of use, and which may be manufactured and sold at moderate cost.

These and other objects and advantages of the invention will be apparent from the following detailed description.

A clear conception of typical embodiments of the several features constituting my present improvement, and of the mode of constructing and of utilizing frost shields built in accordance with the invention, may be had by referring to the drawing accompanying and forming a part of this specification wherein like reference characters designate the same or similar parts in the various views.

Fig. 1 is a fragmentary inside view of a typical truck windshield having one of my improved defroster units associated therewith;

Fig. 2 is a vertical section through the typical truck windshield, showing an end view of the improved defroster assemblage looking toward the right as viewed in Fig. 1 but having the electrical connections for energizing the heating wires, omitted for the sake of clearness;

Fig. 3 is an enlarged transverse section through a fragment of the improved defroster unit, taken along the line 3—3 of Fig. 1;

Fig. 4 is another fragmentary section through an end of the defroster frame, showing one of the improved heating wire supporting springs; and Fig. 5 is a fragmentary section through the main windshield frame, showing the method of attaching the defroster supports thereto.

While the invention has been shown and described herein as being advantageously applicable to electrically heated dead air space frost shields as applied to the windshields of trucks, it is not my desire or intent to unnecessarily limit the scope or to restrict the utility of the device by virtue of this limited disclosure.

Referring to the drawing, the improved defroster illustrated therein, comprises in general an approximately rectangular pane 7 of ordinary safety glass or the like; a continuous metallic frame 8 surrounding the pane 7 and being spaced from the periphery thereof; a continuous sealing strip 9 of rubber or the like, snugly interposed between the frame 8 and the periphery of the pane 7 and having a flexible sealing lip 10 projecting outwardly beyond the frame 8; a U-shaped strip member 11 vertically spanning each end of the frame 8 directly within and adjacent to the sealing strip 9; a series of relatively thin heating wires 12 horizontally spanning the frame 8 adjacent to the pane 7 and loosely penetrating the side members 11; a leaf spring 13 associated with each end of each wire 12, and each having its opposite ends slidably engaging the adjacent member 11; a switch assembly 14 carried by the frame 8 and being adapted to control the energization or heating of the wires 12 from a convenient source of electricity; an elongated L-shaped element 15 rigidly attached to each of the upright ends of the frame 8; a pair of telescopic inner and outer U-shaped supporting brackets 16, 17 respectively, slidably engaging each L-shaped element 15, and having therein alined slots 18 which are alineable with corresponding similar slots formed in the elements 15; clamping bolts 19 coacting with each set of slots 18 to lock the brackets 16, 17 to the elements 15 in adjusted positions; and resilient mountings including clips 20, springs 21, screw bolts 22 and thumb nuts 23 for attaching the outermost ends of the brackets 16, 17 to suitable supports.

The frost shield frame 8, channel members 11, L-shaped elements 15, brackets 16, 17, and clips 20 may all be formed of sheet metal in any suitable manner, and one of the channel members 11 is formed in sections which may be properly insulated from each other in a well known manner, so as to cause the heating current for the wires 12 to pass through these wires whenever the switch 14 is manipulated to place the defroster in active condition. As shown in Figs. 3 and 4, the channel members 11 may be firmly but detachably secured to the main frame 8 by means of insulated screws 24, and the wires 12 are secured to the medial portions of the leaf springs 13, while the opposite ends of each spring 13 have free sliding contact with the adjacent surface of the corresponding member 11. This assemblage of elements insures proper functioning of the resilient springs 13 at all times, and the floating springs 13 cannot become distorted even when the unit is subjected to severe jolts and vibration since these springs are constantly concealed within and protected by the U-shaped members 11.

The elongated L-shaped supporting elements 15 may be firmly secured to the sides of the main frame 8 by spot welding or otherwise, and the slots 18 formed in these elements 15 may be provided with lateral end recesses 25 as shown in Figs. 2 and 3 for effecting insertion of the bolts 19 therein. The brackets 16, 17 which are slidable longitudinally relative to the adjacent supporting elements 15 and relative to each other, have their outer ends bent or off-set inwardly so as to reach under the compression springs 21 as clearly shown in Fig. 5, and the bolts 19 are preferably provided with suitable lock washers and nuts in order to positively and firmly clamp the brackets 16, 17 and the elements 15 to each other, in various positions of adjustment. The mounting clips 20 are of U-shape and are preferably formed of rather resilient metal so as to provide a locking effect for the wing nuts 23, and the compression springs 21 which are housed within these clips 20 should be relatively stiff and also enhance this locking action.

The typical truck windshield assemblage to which the improved defroster unit has been applied in the drawing, comprises a main windshield pane 26 of safety glass or the like, having its peripheral edges snugly confined within a frame 27 by means of suitable packing 28, see Fig. 5. These windshields may be of diverse shapes and sizes, and when it becomes desirable to apply one of the improved defrosters to such a windshield assemblage, four holes adapted for snug reception of the screw bolts 22 should be provided in the windshield frame 27, and the screw bolts 22 should be inserted therein from the outside of the vehicle. The defroster supporting brackets 16 should then be adjusted longitudinally relative to each other so as to cause them to properly cooperate with the screw bolts 22, whereupon the compression springs 21, clips 20, and thumb nuts 23 may be applied as illustrated in Figs. 1, 2 and 5. The clamping bolts 19 may then be firmly applied to the members 15 and brackets 16, 17 whereupon installation will have been completed. The flexible lip 10 of the sealing strip 9 will then coact snugly with the inner surface of the main windshield pane 26 and a dead air space of considerable area will be provided between the parallel panes 7, 26 while the wires 12 will be confined within this dead air space. By subsequently manipulating the switch 14, the air confined within the dead air space may be heated as desired, and this heating of the confined air will prevent undesirable deposition of condensed vapor, frost, snow and ice upon the surfaces of the coacting panes 7, 26.

From the foregoing detailed description it will be apparent that my present invention provides an improved defroster which may be quickly and most effectively firmly associated with a windshield assemblage of the type disclosed, and which will not become loose or ineffective due to extreme vibration and jarring. The improved mountings for the heating wires 12 comprising the floating leaf springs 13, will maintain the wires 12 taut at all times, and will prevent possible contact between these wires and the adjacent panes. The improved mounting brackets 16, 17 may be quickly adjusted to cooperate with windshield frames 27 of various sizes and shapes, and serve to most effectively maintain the frost shield in proper coaction with the windshield pane 26. When properly installed, the dead air space between the panes 7, 26 will be most effectively sealed at all times thus insuring most efficient operation of the defroster unit, and the channel members 11 serve to effectively protect and conceal the floating leaf springs 13 at all times, and provide an extremely neat and finished appearance for the frost shield assemblage. These floating springs 13 have been illustrated diagrammatically in Fig. 1 for the sake of clearness, but their detailed construction is clearly shown in Fig. 4. It is also to be understood that suitable electrical connections are provided between the switch and the source of electric current, and between this switch 14 and the wires 12, and since these connections are of well known construction they have been omitted from the present disclosure. It is noteworthy that by providing elongated slots 18 in the supporting members 15 as well as in the telescopic adjustable brackets 16, 17, the frost shield assemblage may be disposed at different elevations relative to the windshield pane 26, and this is an important feature of the present improvement. The present improvement has gone into highly successful use and the assemblage can obviously be manufactured at moderate cost and properly installed by a novice.

It should be understood that it is not desired to limit this invention to the exact details of construction or to the precise mode of use, herein shown and described, for various modifications within the scope of the appended claim may occur to persons skilled in the art.

I claim:

A vehicle windshield defroster comprising, a frame having a transparent pane mounted therein and being provided at its opposite sides with rigid supporting elements each having an elongated inwardly directed U-shaped flange overlapping the adjacent side of the frame, a pair of superimposed channel shaped telescopically adjustable brackets snugly slidably engaging each of said elements and having end portions projecting considerably beyond the ends of said flanges, each cooperating set of said brackets and the adjacent element flange having registering slots therein, a bolt coacting with each set of said slots for clamping the frame to the adjacent brackets and the latter to each other in various positions of longitudinal adjustment, and a detachable mounting for the projecting end of each of said brackets.

JOEL R. THORP.

REFERENCES CITED

The following references are of record in the file of this patent:

UNITED STATES PATENTS

| Number | Name | Date |
|---|---|---|
| 1,288,677 | Raven | Dec. 24, 1918 |
| 1,427,605 | Lawson | Aug. 29, 1922 |
| 1,721,663 | Holzhauer | July 23, 1929 |
| 2,127,391 | Cole | Aug. 16, 1938 |
| 2,173,196 | Bornemann | Sept. 19, 1939 |
| 2,360,299 | Zaiger | Oct. 10, 1944 |